United States Patent [19]

Lukco et al.

[11] Patent Number: 5,156,912
[45] Date of Patent: Oct. 20, 1992

[54] MULTI-LAYER COATINGS FOR REINFORCEMENTS IN HIGH TEMPERATURE COMPOSITES

[75] Inventors: D. Lukco, Sagamore Hills; M. A. Tenhover, Solon, both of Ohio

[73] Assignee: The Standard Oil Company, Cleveland, Ohio

[21] Appl. No.: 453,512

[22] Filed: Dec. 20, 1989

[51] Int. Cl.$^5$ .................. B32B 9/04; C04B 35/56
[52] U.S. Cl. .................. 428/367; 428/375; 428/378; 428/380; 428/381; 428/384; 428/388; 428/389; 428/689; 501/88; 501/95
[58] Field of Search .............. 428/361, 367, 375, 378, 428/379, 380, 381, 384, 388, 389, 404, 446, 457, 689; 501/88, 95, 153

[56] References Cited

U.S. PATENT DOCUMENTS

| | | | |
|---|---|---|---|
| 3,811,920 | 5/1974 | Galasso et al. | 428/368 X |
| 4,239,536 | 12/1980 | Yamamoto et al. | 75/238 |
| 4,249,913 | 2/1981 | Johnson et al. | 51/295 |
| 4,315,968 | 2/1982 | Suplinskas et al. | 428/367 |
| 4,340,636 | 7/1982 | DeBolt et al. | 428/215 |
| 4,481,249 | 11/1984 | Ebneth et al. | 428/288 |
| 4,511,663 | 4/1985 | Taylor | 501/4 |
| 4,642,271 | 2/1987 | Rice | 428/698 |
| 4,806,428 | 2/1989 | Cooper et al. | 428/403 |
| 4,847,044 | 7/1989 | Ghosh | 419/8 |
| 4,950,558 | 8/1990 | Sarin | 428/698 |
| 4,962,070 | 10/1990 | Sullivan | 501/95 |
| 4,988,564 | 1/1991 | D'Angelo et al. | 428/368 |
| 4,994,416 | 2/1991 | Tiegs et al. | 501/88 |

FOREIGN PATENT DOCUMENTS

| | | |
|---|---|---|
| 0247630 | 12/1987 | European Pat. Off. . |
| 0310043 | 4/1989 | European Pat. Off. . |
| 0326077 | 8/1989 | European Pat. Off. . |
| 59-205464 | 11/1984 | Japan . |
| 63-277566 | 8/1987 | Japan . |
| 2136405 | 7/1970 | United Kingdom . |

OTHER PUBLICATIONS

"Reactive Ion Assisted Deposited of Aluminum Oxynitride Thin Films," Hwangbo et al., Applied Composites, vol. 28, No. 14, pp. 2779–2784.

"Phase Relations and Reaction Sintering of Transparent Cubic Aluminum Oxynitride Spinel," McCauley et al., vol. 62, No. 9–10, pp. 476–479.

"Ceramic Coatings on Ceramics for Improved Oxidation Corrosion Resistance," Davies et al., vol 36, No. 1-2, Dec. 1, 1988, pp. 419–432.

Petrosek, NASA Conference Publication 10039, pp. 8-1-8-13.

World Patent Index Latest, Week 8327, Derwent Publications Ltd., London, GB; & JP-A-58,091-086 May 30, 1983 (Abstract).

World Patent Index Latest, Week 8940 Derwent Publications Ltd., London, GB; & JP-A-1212290, Aug. 25, 1989 (Abstract).

Primary Examiner—George F. Lesmes
Assistant Examiner—Christopher Brown
Attorney, Agent, or Firm—Larry W. Evans; Joseph G. Curatolo; Sue E. Phillips

[57] ABSTRACT

The subject invention relates to a coated reinforcement material comprising a SiC reinforcement having a coating of at least three layers, wherein the layers are alternately A-material layers of the general formula:

$$Al_xO_yN_z$$

wherein x is up to about 60 atomic % of the coating;
y is from about 20 atomic % to about 55 atomic % of the coating; and
z is from about 5 atomic % to about 45 atomic % of the coating, with the proviso that x+y+z=100, and B-material layers comprising a metal alloy, such that the first and last layers of the coating are A-material layers. The invention further relates to a high strength, high temperature performance composite containing the above-specified coated reinforcement.

27 Claims, No Drawings

MULTI-LAYER COATINGS FOR REINFORCEMENTS IN HIGH TEMPERATURE COMPOSITES

FIELD OF THE INVENTION

The subject invention relates to reinforcements for high temperature composites that are chemically stable and mechanically stable. In particular, the invention relates to SiC reinforcement materials coated with multi-layers of ceramics and metals that contribute to the oxidation resistance, mechanical stability and high temperature performance of the resulting composite material.

BACKGROUND OF THE INVENTION

Traditionally, many commercial applications of high temperature materials have been filled by Ni-, Co-, and Fe-based metal alloys. These materials function well at temperatures below about 800° C., but rapidly lose strength upon exposure to higher temperatures. Thus, in the field of high temperature materials, researchers have focused on the use of heat resistant fibers to reinforce both metallic and ceramic materials. These high strength composites possess a unique combination of high strength, temperature stability, and low density. This allows for their use in materials for aerospace, automotive, and industrial applications.

Silicon-containing materials are known reinforcements for composite materials. These composites potentially possess high toughness levels and good performance characteristics, thereby making them highly suitable for applications which require light-weight structural materials having high elasticity, high strength, shapability, heat stability, electrical conductivity and heat conductivity. These composites are being increasingly investigated for structural applications.

It is known that many fiber-matrix combinations undergo extensive chemical reaction or interdiffusion between the fiber and matrix materials, each of which is likely chosen for the contribution of specific mechanical and/or physical properties to the resulting composite. Such reaction or interdiffusion can lead to serious degradation in strength, toughness, ductility, temperature stability and oxidation resistance. Some changes may result from the difference in the thermal expansion coefficients of the materials.

SiC reinforcements have a relatively low thermal expansion coefficient (3-4 ppm/°C.) compared to the metallic alloys and compounds (12-20 ppm/°C.) that they are being developed to reinforce. In general, reinforcements that have high elastic moduli have low thermal expansion coefficients. The thermal expansion mismatch between the matrix material and the SiC reinforcement leads to stress at the reinforcement/matrix interface, and subsequent failure due to fracture of either the reinforcement or the matrix material.

To address this issue, the idea of a compliant layer which is less stiff than the matrix has been proposed to accommodate the stress due to thermal expansion coefficient differences. In a recent review, Petrasek (NASA Conference Publication 10039, pages 8-1 to 8-13) describes these issues for intermetallic matrix composites. One serious problem with the compliant layer concept is related to the chemical compatibility of the compliant layer, which is normally a metal alloy or compound, with both the SiC reinforcement and the matrix material alloy.

To compensate for this problem and others, a variety of coatings have been suggested for reinforcements intended for use in fiber-matrix composites. For example, U.S. Pat. No. 4,340,636 discloses a surface treatment for the formation of a carbon-rich coating on a stoichiometric SiC substrate filament. Similarly, U.S. Pat. No. 4,315,968 discloses coating SiC filaments with a thin coating of Si-rich SiC. U.S. Pat. No. 3,811,920 discusses applying a thin layer of TiC to a filamentary substrate having a SiC surface layer. Boron nitride has also been tried as a SiC coating, as in U.S. Pat. No. 4,642,271.

Intermetallic matrix materials have experienced problems similar to those enumerated hereinabove when combined with reinforcements to produce high performance composites. The problems being experienced in this technology field are generally a result of the fact that the matrix material technology and fiber technology have evolved independent of one another, resulting in chemical and mechanical incompatability of the precursor materials used to produce composites of the fiber-matrix-type. The foregoing citations demonstrate various attempts within the field to overcome the inherent shortcomings of these composites by using coating materials to provide the needed characteristics or compatibility.

However, composite materials which have employed techniques and coatings such as the foregoing nonetheless remain limited for high temperature application by concerns regarding the thermomechanical stability, thermochemical stability, oxidation resistance and high temperature fatigue resistance encountered in atmospheric conditions at temperatures above 800° C. A specific problem encountered with a number of these coatings relates to the chemical reactivity of the coating with the matrix materials, which manifests itself in the failure of the mechanical and physical performance of the material in high temperature environments. This is particularly true in the case of metallic coatings on SiC reinforcements since extensive chemical reactions are known to occur at SiC/metal interfaces.

Accordingly, an object of the subject invention is to provide a multi-layer coating for SiC reinforcements which permits the use of the reinforcement in composite materials for use at high temperatures.

Another object of the invention is to provide a multi-layer coating for SiC reinforcements which prevents chemical reaction between the fiber and the matrix material.

A further object is to provide a composite which contains coated SiC reinforcements which maintain high strength and toughness and resist oxidation at high temperatures.

SUMMARY OF THE INVENTION

The subject invention relates to a coated reinforcement material comprising a SiC reinforcement having a coating of at least three layers, wherein the layers are alternately A-material layers of the general formula:

$$Al_xO_yN_z$$

wherein x is up to about 60 atomic % of the coating;
y is from about 20 atomic % to about 55 atomic % of the coating; and z is from about 5 atomic % to about 45 atomic % of the coating, with the proviso that x+y+z=100, and B-material layers comprising a metal alloy, such that the first and last layers of the coating are A-material layers.

The invention further relates to a high stength, high temperature performance composite containing the above-specified coated reinforcement.

DETAILED DESCRIPTION OF THE INVENTION

The subject invention relates to multi-layer coated reinforcements for use in composite materials. The multi-layer coatings comprise at least three separate layers, A-B-A, with the option to repeat the sequence a desired number of times to gain the desired composite properties. The first layer, or A-material layer, which is deposited closest to the reinforcement surface, and subsequent A-layers, which may or may not have identical stoichiometry, have the general formula:

$$Al_xO_yN_z$$

wherein x is present at up to about 60 atomic % of the coating, y is at least about 20 atomic % but not more than about 55 atomic % of the coating, and z is at least about 5 atomic % but not more than about 45 atomic % of the coating, with the proviso that x+y+z=100.

The A-material layer is of importance due to its compatibility with the reinforcement to be coated, the B-material layer, and the matrix material with which the coated reinforcement is combined to form a composite. The coating effectively inhibits diffusion of Si and C, has excellent oxidation resistance, and is observed to form smooth, adherent coatings on Si-containing reinforcements. This A-material layer provides a chemically inert barrier around the SiC reinforcement preventing it from adverse chemical reactions with subsequent coating layers. These characteristics enhance the capability of a composite containing this material to maintain its strength and high temperature performance, even in the presence of air at temperatures exceeding 800° C. for extended periods of time, thus making the composite highly suitable for demanding industrial applications.

Depending on the deposition procedure used in applying the A-material layer to the reinforcement, the Al, O and N for this layer may be selected from N- and O-containing gases, which may be in the elemental state or may be in the compound form, and the Al may be obtained from volatile Al-containing compounds or metallic Al sources. Further, when using a sputter technique, the A-material layer composition may be directly sputtered from an Al-O-N target.

The second layer, or B-material layer, is a high temperature, ductile material and is deposited on the A-material layer already deposited on the SiC reinforcement. This layer may consist of single component or multi-component metal alloys. Typical B-material layers contain at least one of the following elements: Ni, Fe, Co, Mo, V, Nb, W, Ta, Ti, and Zr. Further, the B-material layer may be a ductile metal alloy, examples of which include but are not limited to NiFe, Ni$_3$Al, NbTi, and Fe$_{90}$V$_{10}$, available commercially from Cerac Corp and Alfa Inorganics, among others. This layer is chemically compatible with the A-material layer and is capable of considerable deformation (>5%) without cracking.

The B-material layer serves to accommodate the difference in thermal expansion coefficients between the reinforcement material and the matrix material. Therefore, it must have a lower Young's modulus than either the reinforcement material or the matrix material. It is particularly advantageous to choose a ductile metal having a large thermal expansion coefficient when the thermal expansion of the matrix material is significantly higher than that of the reinforcement. In such cases, the preferable choices are ductile metal alloys based on Fe, Ni, and Co.

Following the deposition of the B-material layer, another A-material layer is deposited. This layer serves to prevent undesirable chemical reactions between the B-material layer and matrix material. Any number of alternate A- and B-material layers may be deposited. It is important to deposit these layers such that the first and last layers are A-material layers.

The multi-layer coating, as described herein, can be deposited by any conventionally known thick or thin film deposition process, examples of which include but are not limited to chemical vapor deposition, rf sputtering, reactive sputtering, reactive ion plating, and reactive evaporation. The A-material layer should be deposited to a thickness of from about 0.5 microns to about 10 microns, preferably between about 1.0 micron to about 5.0 microns. Optimally, the reinforcement should be completely coated, however minimal areas that remain uncoated will not adversely affect the composite performance due to the localized nature of the reaction sites. The B-material layer, or total amount of B-material in the multi-layer coating, should be about 5.0 microns to about 100.0 microns thick.

When depositing the A-material layers by sputtering, the process is preferably carried out using an Al metal sputter target in the presence of a mixture of nitrogen and oxygen. The ratio of N/O should be greater than about 100/1. Optionally, an inert gas, such as Argon, may also be present. The total pressure of the sputter gas should be less than about 50 mtorr. The temperature during the deposition process may be anywhere from room temperature to about 1000° C. The deposition rate may vary from 1 to about 1000 angstroms/second. The resulting coating should be between about 0.5 microns and about 10 microns thick, and have a density of at least about 80% and preferably greater than 95%.

An alternate means of depositing the A-material layers is chemical vapor deposition, which can be accomplished by using Al-halogen compounds, Al-organometallic compounds or metallic Al, in the presence of a combination of N$_2$ and O$_2$. The temperature range for such a process is between about 400° C. and about 1000° C. Use of an rf or dc plasma to aid in the deposition process may be necessary.

When depositing the B-material layers by sputtering, the process is preferably carried out using a B-material metal target in the presence of an inert gas such as argon. The total pressure of the sputter gas should be less than about 50 mtorr. The temperature during the deposition process may be anywhere from room temperature to about 1000° C. The deposition should be between about 5.0 microns to about 100 microns thick, and have a density of at least about 80%.

The SiC reinforcement material to be coated with the A-B-A coating described herein may be in the form of continuous fibers, chopped fibers, whiskers, or platelets, or any other useful form. Such materials are commercially available from Textron, British Petroleum and Carborundum Company, among others. The reinforcement material may further be amorphous, polycrystalline or single crystal in nature. An appropriate SiC reinforcement for a given application may be selected from those just specified depending on the optimum characteristics to be attained, such as strength-per-weight, smoothness-per-weight, high temperature performance, or toughness, among others.

It may be advantageous, depending on the end use of the material, to form the reinforcement by depositing the SiC reinforcement on a core material, which possesses a very high melting point, prior to deposition of the subject A-B-A coating. Such a core material would typically be carbon or a refractory metal, such as W, Mo or Ti, among others, such as those available commercially from Stackpole Fibers Company and Alfa Inorganics.

Prior to coating the SiC reinforcement material, it may be pretreated to enhance the adherence of the coating to the reinforcement and the smoothness of the reinforcement-coating interface. Such pretreatment processes may include chemical etching, ion etching, flame polishing and mechanical polishing, among others, which may be accomplished by conventional pretreatment techniques.

The coated reinforcement may be fabricated into various shapes or may be woven or otherwise structured prior to combination with the matrix material. This fabrication may also be accomplished according to conventional techniques.

The coated reinforcement may then be combined with a selected matrix material by any of a number of methods and techniques known to those skilled in the art, such as hot pressing or melt infiltration, among others.

Suitable matrix materials into which reinforcements coated according to this disclosure are to be disposed include ceramic, glass and intermetallic matrix composites. Generally, matrix materials include: reaction-bonded SiC; intermetallic alloys containing at least two of Ti, Al, Nb, Ta, Cr, V and Si; glass ceramics containing at least two of Li, Al, Si, O, Ca, Sr and Mg; and metal alloys containing at least two of Al, Si, Mg, Ni and Li. Table I below lists a number of representative matrix materials suitable for use in the subject invention, though this list is not intended to be exhaustive of all possible matrix materials.

"Intermetallic Alloys based on Gamma Titanium Aluminide", and also the silicide alloys described in JOM November 1989, pages 52–55, by Peter J. Meschter and Daniel S. Schwartz entitled "Silicide-Matrix materials for High Temperature Applications." Preferred matrix materials include intermetallic alloys such as $Ti_3Al$, TiAl, $Ti_{44}Nb_{11}Al_{45}$, $TiTaAl_2$, $Ni_3Al$, FeAl and $NbAl_3$.

Matrix materials may be obtained commercially in the form of powders or foils, such as TiAl powder or foil available from Martin-Marietta. Further, the matrix material may be formulated by arc melting, casting, hot pressing or other known techniques.

Composites, such as those containing multi-layer coated SiC reinforcements, are operable in an environment wherein the temperature is up to about 0.9 of the melting point of the matrix material. Further, such composites are operable at pressures from 0 to about 100 atms., and can be used in air, vacuum or inert atmospheres, such as Ar, $N_2$ or He.

EXAMPLES

The following experimentation was conducted to demonstrate the stability of multi-layer SiC reinforcements at elevated temperatures. Coatings were applied to fibers, metal templates, and polished metal alloys and heat treated to ascertain their thermochemical stability. The various coatings were applied to a substrate using magnetron sputtering and a commercial S-gun arrangement. The object to be coated was mounted in a cryopumped (base pressure $2 \times 10^{-7}$ torr) vacuum chamber on a sample holder that rotated about the sputter gun to insure an even coverage of the coating. The foregoing process produced smooth, dense, adherent coatings. The thickness of the coating was determined by a TM-100 thickness monitor in the vacuum chamber.

Following deposition, the samples were tested by exposure to high temperature heat treatments. These were performed in a high vacuum chamber (cryopump $5 \times 10^{-7}$ torr) using a temperature controlled resistance Radak furnace.

X-ray photoelectron spectroscopy (XPS) was used to determine the extent of reaction between the various coatings, matrix materials, and SiC. The XPS spectra were acquired on a PHI 5400 XPS Instrument using 300 watt Mg $K_\alpha$x-rays, and 1 mm diameter spot size. Depth profiling was accomplished by sputtering with an argon ion beam with a current of 25 mA, followed by the

TABLE I

| Potential matrix materials | | |
| --- | --- | --- |
| Intermetallics: | | |
| $Ti_3Al$ | TiAl | $TiAl_3$ |
| $Nb_3Al$ | NbAl | $NbAl_3$ |
| $Zr_3Al$ | ZrAl | $ZrAl_3$ |
| $Ta_3Al$ | TaAl | $TaAl_3$ |
| $Ni_3Al$ | NiAl | $Ni_3AlB_{0.01}$ |
| $Fe_3Al$ | FeAl | $Fe_3AlB_{0.01}$ |
| $Ti_5Si_3$ | $Zr_5Si_3$ | $Al_{67}Ni_8Ti_{25}$ |
| $Ti_{44}Nb_{11}Al_{45}$ | $Ti_{65}V_{10}Al_{25}$ | $Ni_2AlTi$ |
| $TiTaAl_{0.8}Cr_{0.1}V_{0.1}$ | $TiNbAl_{0.7}V_{0.1}Si_{0.3}$ | $MoSi_2$ |
| $TiTaAl_2$ | | |
| Glass Ceramics | | |
| $SiO_2$ | $Al_2O_3$ | MgO |
| $SiO_2.Al_2O_3$ | $CaO.3SiO_2$ | $MgO.SiO_2.2Al_2O_3$ |
| $Li_2O.Al_2O_3.2SiO_2$ | $Li_2O.Al_2O_3.4SiO_2$ | $Li_2O.Al_2O_3.8SiO_2$ |
| $BaO.2SiO_2.2Al_2O_3$ | $CaO.2SiO_2.2Al_2O_3$ | $MgO.CaO.2SiO_2.4Al_2O_3$ |
| $4BaO.8SiO_2.8Al_2O_3.TiO_2$ | | |

For intermetallics, especially interesting are the titanium-aluminide alloys described in a JOM article from July 1989, pages 24–30, by Young-Won Kim entitled, acquisition of the XPS spectra. The pressure in the main analysis chamber during this analysis was less than $10^{-10}$ torr.

EXAMPLE 1

A coated SiC reinforcement was made by magnetron sputtering 1000 angstroms of tungsten onto a sintered fiber of SiC obtained from the Carborundum Company. This coated reinforcement was heated in vacuum to 1000° C. for 12 hours to test its thermal stability. The tungsten was observed to severely react with the SiC and lead to a mechanically weak and brittle reinforcement.

EXAMPLE 2

A tungsten ribbon template obtained from Alfa Inorganics was coated with approximately 500 angstroms of SiC using magnetron sputtering from a SiC target. This structure was heated in vacuum for 4 hours at 800° C. X-ray photoelectron spectroscopy depth profiling was performed to determine the stability of this structure. This analysis showed that the SiC layer had been consumed during the heat treatment and that brittle tungsten-carbides and tungsten-silicides had been formed.

EXAMPLE 3

A tungsten ribbon template obtained from Alfa Inorganics was coated with approximately 2000 angstroms of $Al_{44}O_{18}N_{38}$ followed by magnetron sputtering of 500 angstroms of SiC. This structure was heated in vacuum for 4 hours at a temperature of 1000° C. X-ray photoelectron spectroscopy depth profiling was performed to determine the stability of this structure. This analysis showed that the SiC, $Al_{44}O_{18}N_{38}$, and tungsten components were unchanged by the heat treatment. The Al-O-N layer was, therefore, effective in preventing any significant reaction between tungsten and SiC.

EXAMPLE 4

A matrix material of the composition TiAl was prepared by melting pure Al and Ti using a Centorr Arc Melting furnace model 5BJ. This matrix material was polished and used as a template for the deposition of 2000 angstroms of $Al_{44}O_{18}N_{38}$. This structure was heated in vacuum for 4 hours at a temperature of 1000° C. X-ray photoelectron spectroscopy depth profiling was performed to determine the stability of this structure. This analysis showed that the TiAl and Al-O-N components had not reacted and the structure was stable at high temperature. This example, combined with Example 3, demonstrate that multi-layers of Al-O-N and tungsten can be used in TiAl matrix composites with SiC reinforcements, provided that the Al-O-N layers are the only layers in contact with both the TiAl and tungsten components of the composite.

The foregoing examples have been presented to demonstrate the oxidation and corrosion resistance in air at high temperatures above 800° C. of SiC reinforcement materials coated with a multi-layer coating of the type disclosed herein. These examples are not intended to limit the subject invention, the breadth of which is defined by the specification and the claims appended hereto, but are presented rather to aid those skilled in the art in clearly understanding the invention defined herein.

What we claim is:

1. A coated reinforcement material comprising a SiC reinforcement having a coating of at least three layers, wherein said layers are alternately A-material layers and B-material layers, said A-material layers of the general formula:

$$Al_xO_yN_z$$

wherein x is greater than zero to about 60 atomic percent of said A-material layer;
y is from about 20 atomic percent to about 55 atomic percent of said A-material layer; and
z is from about 5 atomic percent to about 45 atomic percent of said A-material layer, with the proviso that $x+y+z=100$, and said B-material layers comprising a metal alloy, such that the first and last layers of said coating are said A-material layers, and wherein said B-material layers have a lower Young's modulus than said SiC reinforcement.

2. The coated reinforcement material as in claim 1 wherein said coating is deposited by a thick film deposition process.

3. The coated reinforcement material as in claim 1 wherein said coating is deposited by a thin film deposition process.

4. The coated reinforcement material as in claim 1 wherein said A-material layers are from about 0.5 microns to about 10 microns thick.

5. The coated reinforcement material as in claim 1 wherein the total thickness of all said B-material layers is from about 5.0 microns to about 100.0 microns thick.

6. The coated reinforcement material as in claim 1 wherein said SiC reinforcement is selected from the group consisting of continuous fibers, chopped fibers, whiskers and platelets.

7. The coated reinforcement material as in claim 1 wherein said B-material layer metal alloys contain at least one element selected from the group consisting of Ni, Fe, Co, Mo, V, Nb, W, Ta, Ti and Zr.

8. The coated reinforcement material as in claim 1 wherein said B-material layer metal alloy is selected from the group consisting of $NiFe_3$, $Ni_3Al$, NbTi and $Fe_{90}V_{10}$.

9. The coated reinforcement material as in claim 1 wherein said SiC reinforcement is pretreated prior to the addition of said coating to said SiC reinforcement.

10. The coated reinforcement material as in claim 1 wherein said coated reinforcement material is fabricated into a shape.

11. The coated reinforcement material as in claim 1 wherein said coated reinforcement material is woven.

12. The coated reinforcement material as in claim 1 wherein said SiC reinforcement is deposited on a core material.

13. The coated reinforcement material as in claim 12 wherein said core material is selected from the group consisting of W, Mo and Ti.

14. A high strength, high temperature performance composite comprising a SiC reinforcement material having an at least three layer coating, wherein said layers alternately comprise A-material layers of aluminum, oxygen and nitrogen, and B-material layers of metal alloys, such that the first and last layers of said coating are said A-material layers, said coated SiC reinforcement material being incorporated in a matrix material selected from the group consisting of ceramic, glass and intermetallic, and wherein said B-material layers have a lower Young's modulus than either said SiC reinforcement and said matrix material.

15. The composite as in claim 14 wherein said matrix material is selected from the group consisting of reaction-bonded SiC, intermetallic alloys, glass ceramics and metal alloys.

16. The composite as in claim 14 wherein said matrix material is selected from the group consisting of $Ti_3Al$, TiAl, $Ti_{44}Nb_{11}Al_{45}$, $TiTaAl_2$, $Ni_3Al$, FeAl and $NbAl_3$.

17. The composite as in claim 14 wherein said A-material layers are of the general formula:

$$Al_xO_yN_z$$

wherein x is greater than zero to about 60 atomic percent of said A-material layer;

y is from about 20 atomic percent to about 55 atomic percent of said A-material layer and z is from about 5 atomic percent to about 45 atomic percent of said A-material layer; with a proviso that $x+y+z=100$.

18. The composite as in claim 14 wherein said B-material layer metal alloys contain at least one of Ni, Fe, Co, Mo, V, Nb, W, Ta, Ti and Zr.

19. The composite as in claim 14 wherein said B-material layer metal alloy is selected from the group consisting of $NiFe_3$, $Ni_3Al$, NbTi and $Fe_{90}V_{10}$.

20. The composite as in claim 14 wherein said coating has a density of greater than 80%.

21. The composite as in claim 14 wherein said coating has a density of greater than 95%.

22. The composite as in claim 14 wherein said coating is deposited by a thick film deposition process.

23. The composite as in claim 14 wherein said coating is deposited by a thin film deposition process.

24. The composite as in claim 14 wherein said A-material layers are from about 0.5 microns to about 10 microns thick.

25. The composite as in claim 14 wherein the total thickness of all said B-material layers is from about 5.0 microns to about 100.0 microns thick.

26. The composite as in claim 14 wherein said reinforcement material is selected from the group consisting of continuous fibers, chopped fibers, whiskers and platelets.

27. The composite as in claim 14 wherein said reinforcement material is pretreated prior to the deposition of said coating.

* * * * *